US012526260B2

(12) United States Patent
Rollet (10) Patent No.: US 12,526,260 B2
(45) Date of Patent: Jan. 13, 2026

(54) TRANSMITTING AND RECEIVING METHOD, COMMUNICATING DEVICE, AND LOCAL AREA NETWORK

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 18/714,907

(22) PCT Filed: Sep. 30, 2022

(86) PCT No.: PCT/JP2022/037527
§ 371 (c)(1),
(2) Date: May 30, 2024

(87) PCT Pub. No.: WO2023/139855
PCT Pub. Date: Jul. 27, 2023

(65) Prior Publication Data
US 2025/0030671 A1    Jan. 23, 2025

(30) Foreign Application Priority Data
Jan. 20, 2022   (EP) .................................... 22305060

(51) Int. Cl.
*G06F 15/16*   (2006.01)
*H04L 9/40*   (2022.01)
*H04L 67/12*   (2022.01)

(52) U.S. Cl.
CPC ........ *H04L 63/0435* (2013.01); *H04L 63/123* (2013.01); *H04L 67/12* (2013.01)

(58) Field of Classification Search
CPC .... H04L 63/0435; H04L 63/123; H04L 67/12
See application file for complete search history.

(56) References Cited

U.S. PATENT DOCUMENTS 7,499,500 B2 * 3/2009 Page ...................... H04J 3/00
375/295
2017/0230338 A1 * 8/2017 Loprieno ............... H04L 9/065

OTHER PUBLICATIONS

Ashjaei et al., "Time-Sensitive Networking in automotive embedded systems: State of the art and research opportunities", Journal of Systems Architecture, Elsevier BV, NL, vol. 117, Apr. 10, 2021, pp. 1-15.

(Continued)

*Primary Examiner* — Normin Abedin
(74) *Attorney, Agent, or Firm* — Birch, Stewart, Kolasch & Birch, LLP (57) ABSTRACT

The present disclosure relates to a method for transmitting data by a communicating device on a communication channel, wherein the transmitting method comprises, for each temporal cycle:
  determining, by the communicating device, a secured data frame based on the data to be transmitted,
  transmitting, by the communicating device, the secured data frame on the communication channel,
wherein each secured data frame includes secured content determined by using an initialization vector, wherein the initialization vector has a lifetime associated thereto, the lifetime being greater than or equal to a plurality of cycle periods, wherein the initialization vector is not modified when the data to be transmitted is identical to the data transmitted in the previous temporal cycle provided the lifetime of the initialization vector has not expired.

19 Claims, 4 Drawing Sheets

(56) References Cited

OTHER PUBLICATIONS

International Search Report for PCT/JP2022/037527 (PCT/ISA/210) mailed on Jan. 25, 2023.
Moguira et al., "Secure Critical Traffic of the Electric Sector over Time-Sensitive Networking", 2020 XXXV Conference on Design of Circuits and Integrated Systems (DCIS), IEEE, Nov. 18, 2020, pp. 1-6.
Written Opinion for PCT/JP2022/037527 (PCT/ISA/237) mailed on Jan. 25, 2023.

\* cited by examiner

TRANSMITTING AND RECEIVING METHOD, COMMUNICATING DEVICE, AND LOCAL AREA NETWORK

TECHNICAL FIELD

The present disclosure relates to communication systems and relates more specifically to a method and communicating device for securing communications in local area network, LAN, such as e.g. an industrial Ethernet-based LAN.

BACKGROUND ART

In a typical industrial network, communicating devices are usually connected by a bus using a daisy chain topology. Typically, a master communicating device (usually a programmable logic controller, PLC), sends data frames to slave communicating devices and each communicating device that receives a data frame forwards it to adjacent communicating devices if it is not the recipient of the received data frame. In the reverse direction, each communicating device may also send data frames to the master communicating device. Data frames generated by the communicating device located at the other end of the daisy chain topology with respect to the master communicating device of the daisy chain topology are forwarded by every intermediate communicating device up to the master communicating device.

For instance, the data frames exchanged between the communicating devices may be Ethernet data frames. In industrial networks, data frames may need to be exchanged with stringent time latency requirements, for instance every 30 microseconds (μs). Time sensitive networking, TSN, is the set of IEEE802.1 standard technologies defined to provide deterministic messaging on standard Ethernet protocols. The key to providing on-time delivery of time sensitive data frames is the IEEE802.1Qbv standard. More specifically, the IEEE802.1Qbv standard defines a time-aware scheduler designed to separate the communication on the Ethernet communication channel into repeated temporal cycles of fixed duration. Within these temporal cycles, different time slices can be configured that can be assigned to traffic classes having different priorities. Such time slices can be considered as virtual communication channels and enable the separation of time-sensitive traffic from non-time-sensitive background traffic.

Figure 1:
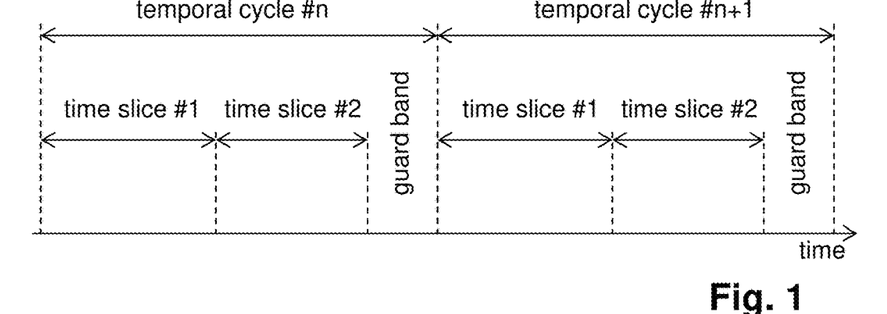
FIG. 1 is a diagram representing an example of temporal cycles and time slices as per the IEEE802.1Qbv standard.

FIG. 1 represents schematically a temporal diagram illustrating such temporal cycles and time slices as relied upon by the IEEE802.1Qbv standard. In the example illustrated by FIG. 1, two temporal cycles are represented denoted by respectively "temporal cycle #n" and "temporal cycle #n+1". Each temporal cycle comprises two time slices denoted by respectively "time slice #1" and "time slice #2". Also, a guard band is provided after the time slice #2 of each temporal cycle and before the beginning of the time slice #1 of the next temporal cycle. For instance, the time slices #1 may be reserved for data frames tagged with a virtual local area network, VLAN, priority 7 (as defined by the IEEE802.1Q standard), while the time slices #2 may be used for data frames tagged with VLAN priorities 0 to 6.

Traditionally, industrial field bus networks were isolated LANs in the sense that they were not connected to other networks, and in particular not connected to Internet. Accordingly, such industrial networks were not really exposed to external threats and provided very little support for security mechanisms.

However, with the emergence of protocols, such as defined by the IEEE802.1 TSN standard set, which enable the coexistence of time-sensitive data frames and non-time-sensitive data frames on the same communication channel, the industrial networks may also be used for applications with less stringent time latency requirements. Hence, new communicating devices (e.g. other than a master PLC and its slave communicating devices) with less stringent time latency requirements may be additionally connected to the industrial network.

With these new communicating devices connected, the industrial network may be subject to new threats since it may no longer be considered to be a strictly isolated network, for instance if one or more of the new communicating devices can connect to Internet.

For instance, in the case of an industrial network with communicating devices connected by a bus using a daisy chain topology, with one of the communicating devices being corrupted, possible attacks include:

Eavesdropping: an attacker may use the corrupted communicating device to eavesdrop the data frames relayed by said corrupted communicating device; however, the data exchanged between e.g. a master PLC and its slave communicating devices is usually very low-level and may be difficult to exploit as such by the attacker, Data frame injection: an attacker may use the corrupted communicating device to inject malicious data frames on the communication channel which may cause a malfunction of the master PLC and its slave communicating devices, and possibly severe hardware damages, Data frame replay: an attacker may use the corrupted communicating device to inject malicious data frames that are crafted from valid data frames transmitted by non-corrupted communicating device and eavesdropped by the corrupted communicating device, Data frame alteration or deletion: an attacker may use the corrupted communicating device to alter or delete a relayed data frame which may cause a malfunction of the master PLC and its slave communicating devices.

Hence, there is a need for introducing security mechanisms in industrial networks, which were traditionally designed as isolated networks, in order to be able to increase the robustness of the industrial network against all or part of the attacks discussed above. However, such security mechanisms should be introduced while ensuring that the stringent latency requirements can still be met, and preferably while limiting the changes to be introduced to the existing communicating devices.

SUMMARY OF INVENTION

The present disclosure aims at improving the situation. In particular, the present disclosure aims at overcoming at least some of the limitations of the prior art discussed above, by proposing a solution for introducing security mechanisms in industrial networks. In preferred embodiments, the present disclosure aims at proposing a solution that may be deployed even on existing communicating devices, e.g. by software updates.

For this purpose, and according to a first aspect, the present disclosure relates to a method for transmitting data by a communicating device on a communication channel shared by a plurality of communicating devices, the communication over the communication channel being organized according to temporal cycles repeated at a predetermined cycle period, wherein the communicating device is required to transmit data every temporal cycle and the data to be transmitted is repeated from one temporal cycle to the following if no new data to be transmitted is available. Said transmitting method comprises, for each temporal cycle:

determining, by the communicating device, a secured data frame based on the data to be transmitted,     transmitting, by the communicating device, the secured data frame on the communication channel.

Also, each secured data frame includes secured content determined by using a predetermined initialization vector, wherein the initialization vector has a lifetime associated thereto which corresponds to a maximum duration during which said initialization vector can remain unmodified, said lifetime being greater than or equal to a predetermined plurality of cycle periods. The initialization vector is not modified when the data to be transmitted in the current temporal cycle is identical to the data transmitted in the previous temporal cycle provided the lifetime of said initialization vector has not expired.

Hence, the present disclosure considers the case of a cyclic transmission, i.e. the case where a communicating device (e.g. a master PLC) is required to transmit data every temporal cycle. With temporal cycles repeated with a cycle period of e.g. 100 µs, the communicating device is therefore required to transmit data every 100 µs. The communicating device may not have new data to transmit every cycle period and, if no new data is available, the communicating device retransmits the data transmitted during the previous temporal cycle. Hence, with a very short cycle period (e.g. 30 µs), the communicating device may have to retransmit several times exactly the same data.

For each temporal cycle, the communicating device determines secured content based on an initialization vector. As in conventional cryptographic algorithms, the initialization vector is an input used to initialize the cryptographic algorithm. The initialization vector includes for instance a random or pseudo-random number, or any number that may be updated at least in part in order to modify the state of the cryptographic algorithm. The secured content may include a signature for authenticating the communicating device encrypted data determined by encrypting the data to be transmitted, etc. It may be computed by using any cryptographic algorithm known to the skilled person. The communicating device then generates and transmits on the communication channel a secured data frame which includes the secured content.

In order to limit the computational complexity required to determine the secured content, to facilitate its determination even with very short cycle periods, the initialization vector is updated only when the data to be transmitted in the current temporal cycle is different from the data transmitted during the previous temporal cycle. Hence, the initialization vector is not necessarily updated at each temporal cycle, such that the cryptographic algorithm(s) used to compute the secured content need not to be executed at each temporal cycle, but only when the data to be transmitted is updated. In industrial networks with very short cycle periods, e.g. 30 µs, the same data may be repeated multiple times such that the same secured content may be used over several temporal cycles, without having to be recomputed from scratch at each temporal cycle, thereby drastically limiting the computational complexity with respect to updating the secured content at each temporal cycle. This limited computational complexity enables to implement the secured content determination in software, such that it can be used even in existing industrial networks, without hardware changes, by a simple software update.

However, in order to prevent from repeating too many times the same secured content and to increase the robustness against replay attacks, the initialization vector has a lifetime associated thereto which recurrently forces the communicating device to modify said initialization vector even when the data to be transmitted in the current temporal cycle is identical to the data transmitted in the previous temporal cycle. The lifetime is for instance equal to N cycle periods, with $N \geq 2$, such that the initialization vector (and the secured content computed therefrom) cannot remain unchanged for more than N consecutive temporal cycles. For instance, $N \geq 3$ or $N \geq 5$.

In specific embodiments, the transmitting method can further comprise one or more of the following optional features, considered either alone or in any technically possible combination.

In specific embodiments, the secured content of the secured data frame of the previous temporal cycle is repeated in the current temporal cycle, without recomputing said secured content, responsive to determining that recomputing a secured content for the current temporal cycle would yield the same secured content as in the previous temporal cycle.

In specific embodiments, the determination of the secured content of the secured data frame is implemented by software.

In specific embodiments, each temporal cycle comprises at least a first time slice and a second time slice, said first time slices for communicating data having higher timing constraints than data communicated during said second time slices, and the secured data frames are transmitted during the first time slices.

In specific embodiments, the secured data frames are determined by providing the secured content to an industrial Ethernet protocol stack.

In specific embodiments, the secured data frames are determined by providing the secured content to an industrial Ethernet time-sensitive networking, TSN, protocol stack.

In specific embodiments, the secured content of each secured data frame is further determined by using a predetermined symmetric key.

In specific embodiments, the secured content includes a signature and/or encrypted data.

In specific embodiments, the secured data frame includes all or part of the initialization vector.

In specific embodiments, the lifetime of the initialization vector is greater than or equal to N times the cycle period, with $N \geq 2$. In preferred embodiments, $N \geq 5$.

According to a second aspect, the present disclosure relates to a method for receiving data frames by a communicating device, said data frames being transmitted by another communicating device by using a transmitting method according to any one of the embodiments of the present disclosure, wherein the communicating device processes the secured content included in a secured data frame to authenticate the other communicating device and/or to decrypt the data included in the secured data frame, wherein said receiving method comprises:

receiving a secured data frame in the current temporal cycle,     extracting the secured content from the secured data frame of the current temporal cycle,     responsive to detecting that the secured content extracted from the secured data frame of the current temporal cycle is identical to the secured content extracted from the secured data frame received in the previous temporal cycle and responsive to detecting that the initialization vector has not expired: reusing the result of the processing of the secured content of the secured data frame of the previous temporal cycle without processing the secured content of the secured data frame of the current temporal cycle.

In specific embodiments, the receiving method can further comprise one or more of the following optional features, considered either alone or in any technically possible combination.

In specific embodiments, the processing of the secured content is implemented by software.

According to a third aspect, the present disclosure relates to a computer program product comprising instructions which, when executed by at least one processor, configure said at least one processor to carry out a transmitting method and/or a receiving method according to any one of the embodiments of the present disclosure.

According to a fourth aspect, the present disclosure relates to a computer-readable storage medium comprising instructions which, when executed by a at least one processor, configure said at least one processor to carry out a transmitting method and/or a receiving method according to any one of the embodiments of the present disclosure.

According to a fifth aspect, the present disclosure relates to a communicating device comprising at least one processor and at least one memory, configured to carry out a transmitting method and/or a receiving method according to any one of the embodiments of the present disclosure.

According to a sixth aspect, the present disclosure relates to a local area network, LAN, comprising a plurality of communicating devices according to any one of the embodiments of the present disclosure, wherein at least some of the communicating devices are connected together according to a daisy chain topology.

The invention will be better understood upon reading the following description, given as an example that is in no way limiting, and made in reference to the figure.

DESCRIPTION OF EMBODIMENTS

In these figures, references identical from one figure to another designate identical or analogous elements. For reasons of clarity, the elements shown are not to scale, unless explicitly stated otherwise.

Also, the order of steps represented in figures is provided only for illustration purposes and is not meant to limit the present disclosure which may be applied with the same steps executed in a different order.

Figure 2:
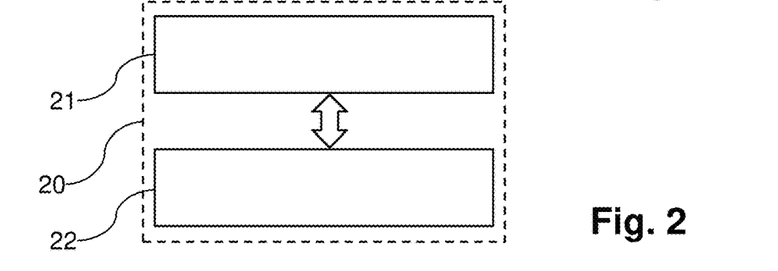
FIG. 2 is a schematic representation of a communicating device.

FIG. 2 represents schematically an exemplary embodiment of a communicating device 20 that can be connected to a local area network, LAN, such as an industrial LAN.

As illustrated by FIG. 2, the communicating device 20 comprises an application unit 21 and a communication unit 22.

The communication unit 22 is adapted to transmit and to receive data on a communication channel, according to at least one wired communication protocol. More specifically, the communication over the communication channel is organized according to temporal cycles repeated at a predetermined cycle period $T_0$, i.e. a new temporal cycle is started every $T_0$. The communication unit 22 is configured to perform cyclic transmission, i.e. it is configured to transmit data on the communication channel every temporal cycle at an accurate time, even if it implies repeating previously transmitted data. In preferred embodiments, the communication unit 22 implements at least one industrial Ethernet protocol, i.e. a protocol relying on the standard Ethernet protocols in an industrial environment and providing determinism and real-time control. The industrial Ethernet protocol, and the standard Ethernet protocols below said industrial Ethernet protocol, are collectively referred to as "industrial Ethernet protocol stack". Most industrial Ethernet protocols are proprietary protocols and relying on standard Ethernet protocols introduces interoperability to some extent. For instance, the communication unit 22 is compliant with IEEE standards such as the 10BASE-T/100BASE-TX IEEE802.3 standards. The communication unit 22 may support the IEEE802.1Q standard for VLAN tag detection and/or the IEEE1588-2008 standard for precision networked clock synchronization or gigabit speed. In preferred embodiments, the communication unit 22 may support IEEE TSN extensions such as the IEEE802.1Qbv standard. Examples of industrial Ethernet protocols include Ether-CAT®, EtherNet/IP®, PROFINET®, POWERLINK, SERCOS® III, CC-Link® IE, Modbus®, etc. In the present disclosure, industrial Ethernet protocols relying on TSN extensions such as the IEEE802.1Qbv standard are referred to as Industrial Ethernet TSN (IE-TSN) protocols. The protocol CC-Link IE TSN, CCIET, is a non-limitative example of an IE-TSN protocol. The combination of an IE-TSN protocol and of the underlying standard Ethernet protocols (including TSN extensions) is referred to as "industrial Ethernet TSN protocol stack".

The application unit 21 implements the application layer which uses the services of the communication unit 22, and which therefore produces data to be transmitted on the communication channel to another communicating device 20 and processes data received on the communication channel from another communicating device 20. In an industrial LAN, in which a plurality of communicating devices 20 are connected by a communication channel, each communicating device 20 may be e.g. one among a PLC, a sensor, an actuator, a human machine interface (HMI), etc., and the application layer depends on the type of communicating device 20 considered.

Each of the communication unit 22 and the application unit 21 comprises for instance one or more processors and one or more memories. The one or more processors may include for instance a central processing unit (CPU), a digital signal processor (DSP), etc. The one or more memories may include any type of computer readable volatile and non-volatile memories (magnetic hard disk, solid-state disk, optical disk, electronic memory, etc.). The one or more memories may store a computer program product (software), in the form of a set of program-code instructions to be executed by the one or more processors in order to implement all or part of the steps of a transmitting method 30 and/or a receiving method 60. Alternatively, or in combination thereof, one or both of the communication unit 22 and the application unit 21 can comprise one or more programmable logic circuits (FPGA, PLD, etc.), and/or one or more specialized integrated circuits (ASIC), and/or a set of discrete electronic components, etc., for implementing all or part of the steps of the transmitting method 30 and/or the receiving method 60. In some cases, all or part of the underlying hardware resources can be shared by the communication unit 22 and the application unit 21. For instance, a same processor and a same memory may be used by both the communication unit 22 and the application unit 21 of the communicating device 20.

In preferred embodiments, the communication unit 22 may be implemented exclusively in hardware (FPGA, PLD, ASIC), in particular to support very short cycle periods (lower than 100 μs, e.g. 30 μs). In turn, the application unit 21 may be implemented in software (i.e. program-code instructions executed by one or more processors), and the application unit 21 and the communication unit 22 may for instance exchange data via a shared memory.

In preferred embodiments, all or part of the communicating devices 20 may be connected according to a daisy chain topology. However, other topologies may also be considered in the present disclosure.

Figure 3:
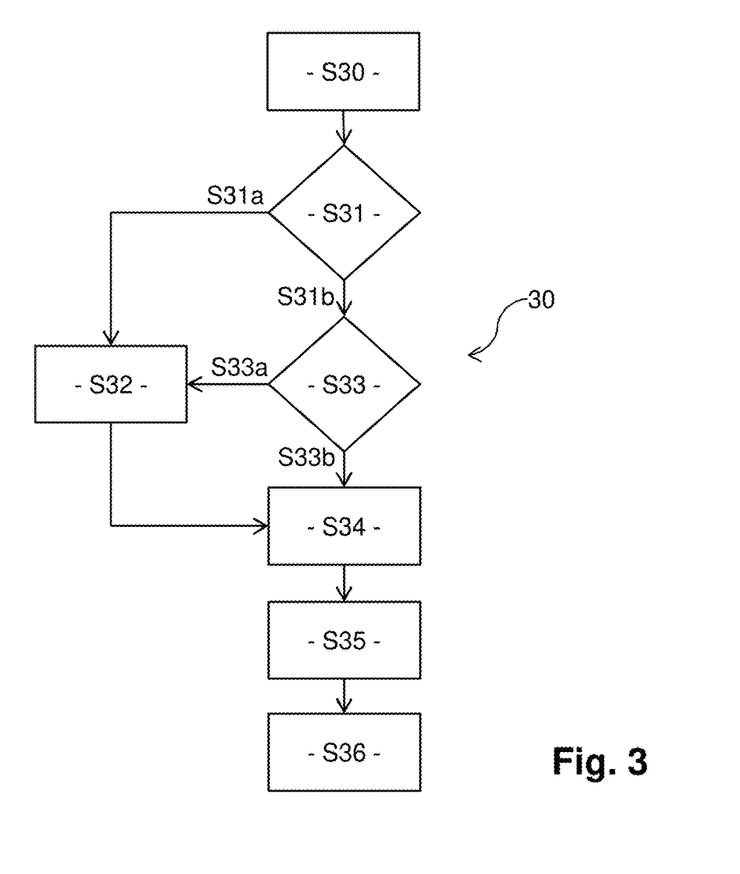
FIG. 3 is a diagram representing the main steps of an exemplary embodiment of a transmitting method.

FIG. 3 represents schematically the main steps of an exemplary embodiment of a transmitting method 30 for securing the cyclic transmissions of a communicating device 20 in a LAN, such as an industrial LAN.

As discussed above, the present disclosure relies on conventional cryptographic algorithms to secure the data to be transmitted by the communicating device 20. In particular, an initialization vector is used to determine the secured content (which corresponds for instance to a signature for authenticating the communicating device 20 and/or to encrypted data obtained by encrypting the data to be transmitted) which is included in secured data frames transmitted on the communication channel. However, the present disclosure exploits the specificities of the cyclic transmission to introduce such security mechanisms while limiting the required computational complexity. In particular, while conventional security mechanisms require that the initialization vector is updated at each transmission, the present disclosure does not require the initialization vector to be updated at each transmission (i.e. at each temporal cycle) such that the cryptographic algorithms need not to be executed every temporal cycle, i.e. with a cycle period $T_0$.

As illustrated by FIG. 3, the transmitting method 30 comprises a step S30 of retrieving data to be transmitted to another communicating device 20, said data generated by the application layer (implemented by the application unit 21). Hence, the data to be transmitted, retrieved during step S30, corresponds to application data. Since the communicating device 20 performs cyclic transmission, the data to be transmitted in a current temporal cycle may be identical to the data transmitted during the previous temporal cycle. Indeed, if no new data is available for transmission, the data transmitted in the previous temporal cycle is repeated in the current temporal cycle.

In the example illustrated by FIG. 3, the communicating device 20, for instance the application unit 21, evaluates during a step S31 whether or not the data to be transmitted in the current temporal cycle is identical to the data transmitted in the previous temporal cycle.

If the data to be transmitted in the current temporal cycle is different from the data transmitted in the previous temporal cycle (reference S31a in FIG. 3), then the transmitting method 30 comprises a step S32 of updating the initialization vector. For instance, if the initialization vector includes a random or pseudo-random number, then updating the initialization vector includes selecting another random or pseudo-random number using a (pseudo) random number generator. Alternatively, or in combination thereof, the initialization vector may include a counter which is incremented (or decremented) when it is updated. In some cases, the initialization vector may also include a static part (such as the address of the transmitting communicating device 20 or the address of the destination communication device 20, or a combination thereof, etc.) which is not updated, and a dynamic part which can be updated.

If the data to be transmitted in the current temporal cycle is identical to the data transmitted in the previous temporal cycle (reference S31b in FIG. 3), then the transmitting method 30 comprises a step S33 of evaluating whether a lifetime of the initialization vector has expired. Indeed, in order to prevent the initialization vector from remaining unchanged during too many temporal cycles, a lifetime is associated to the initialization vector which is representative of a maximum duration during which said initialization vector can remain unmodified. Said lifetime is greater than or equal to a predetermined plurality of cycle periods $T_0$, in order to ensure that the initialization vector can remain unchanged for at least two temporal cycles (and preferably more than two temporal cycles) provided the data to be transmitted being unchanged from the previous temporal cycle. For instance, the lifetime is equal to $N \times T_0$, with N being an integral number such that $N \geq 2$. For instance, $N \geq 3$ or $N \geq 5$.

If the lifetime of the initialization vector has expired (reference S33a in FIG. 3), then the initialization vector needs to be updated, and the step S32 is executed. If the lifetime of the initialization vector has not expired (reference S33b in FIG. 3), then the initialization vector is not updated.

For instance, every time the initialization vector is updated (during step S32), a counter LT is set to N (LT←N) and the step S33 first decrements the counter LT (LT←LT−1) before evaluating if the lifetime has expired. During step S33, the lifetime may then be considered to have expired if LT=0.

As illustrated by FIG. 3, the transmitting method 30 then comprises a step S34 of determining secured content by using the initialization vector. The secured content may for instance include a signature for authenticating the communicating device 20 and/or encrypted data (in which case the secured content is also determined based on the data to be transmitted). The step S34 is preferably executed by the application unit 21. As detailed hereinbelow, determining the secured content corresponds to either computing said secured content by actually executing the cryptographic algorithms or, when possible, repeating the secured content transmitted during a previous temporal cycle.

As discussed previously, the determination of the secured content may use any cryptographic algorithm known to the skilled person. In preferred embodiments, the secured content is further determined by using a predetermined symmetric key, i.e. a key known to both the transmitting communicating device 20 and any receiving communicating device 20. The symmetric key may be distributed to the communicating devices 20 required to transmit and/or receive secured content via conventional key distribution methods, for instance by establishing secure channels between said communicating devices 20 and a trusted key server. Symmetric key distribution is out of scope of the present disclosure. However, the symmetric key might be updated recurrently, for instance periodically with a key updating period greater than the lifetime of the initialization vector (and preferably significantly greater than said lifetime, for instance several hours or more). Hence, in some cases, the secured content might differ from a temporal cycle to the following even if the initialization vector is not modified, due to an update of the symmetric key.

As illustrated by FIG. 3, the transmitting method 30 then comprises a step S35 of determining a secured data frame which includes the secured content. If the secured content does not include encrypted data, the data to be transmitted, generated during step S30 by the application layer, is also included in the secured data frame. The secured data frame is then transmitted on the communication channel during a step S36. The step S35 of determining the secured data frame and the step S36 of transmitting the secured data frame are executed by the communication unit 22 of the communicating device 20.

The steps of the transmitting method 30 shown in FIG. 3 are repeated at each temporal cycle, since at least one secured data frame is to be transmitted on the communication channel every temporal cycle.

Figure 4:
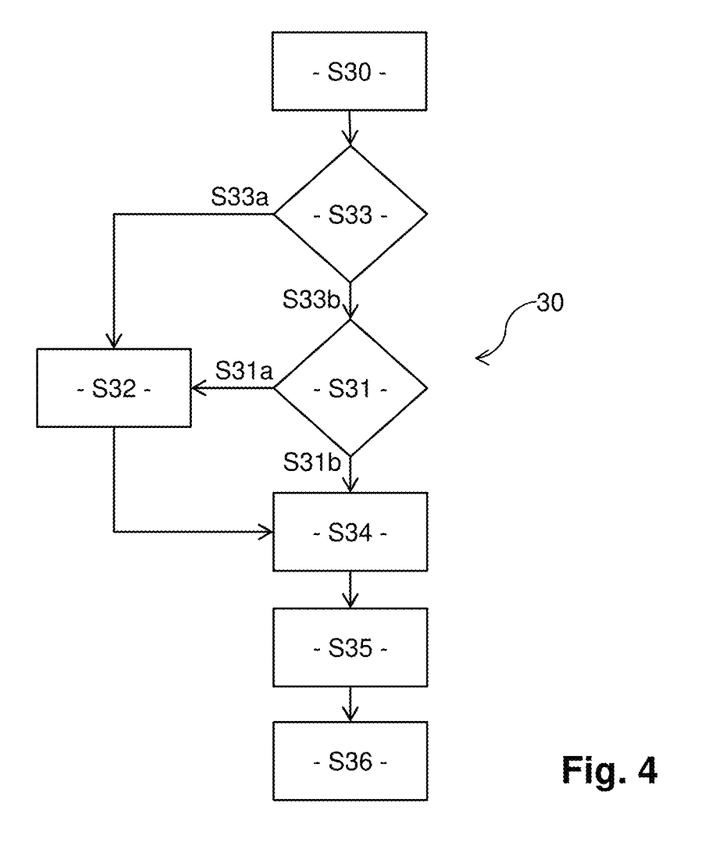
FIG. 4 is a diagram representing the main steps of another exemplary embodiment of a transmitting method.

FIG. 4 represents schematically the main steps of another exemplary embodiment of the transmitting method 30. The steps described in reference to FIG. 3 are all included in FIG. 4, but with a slightly different order which modifies the way the lifetime is handled. As illustrated by FIG. 4, the transmitting method 30 comprises the step S30 of retrieving the data to be transmitted. Then the transmitting method 30 comprises the step S33 of evaluating whether the lifetime has expired. If the lifetime has expired (reference S33a in FIG. 4), the step S32 of updating the initialization vector is executed. If the lifetime has not expired (reference S33b in FIG. 4), then the transmitting method 30 comprises the step S31 of evaluating whether the data to be transmitted in the current temporal cycle is identical to the data transmitted in the previous temporal cycle. If the data to be transmitted in the current temporal cycle is different from the data transmitted in the previous temporal cycle (reference S31a in FIG. 4), then the step S32 of updating the initialization vector is executed. If the data to be transmitted in the current temporal cycle is identical to the data transmitted in the previous temporal cycle (reference S31b in FIG. 4), then the initialization vector is not updated. Then, the transmitting method 30 comprises the step S34 of determining the secured content, the step S35 of determining the secured data frame and the step S36 of transmitting the secured data frame on the communication channel. For instance, the counter LT may be set to N (LT←N) only when the initialization vector is updated (during step S32) because the lifetime has expired. Hence, the counter LT is not set to N if the initialization vector is updated because the data to be transmitted in the current temporal cycle is different from the data transmitted in the previous temporal cycle. Similarly, the step S33 first decrements the counter LT (LT←LT−1) before evaluating if the lifetime has expired and the lifetime is considered to have expired if LT=0. In the embodiment of FIG. 4, the initialization vector is therefore updated periodically every N temporal cycles and may further be updated when the data to be transmitted in the current temporal cycle is different from the data transmitted in the previous temporal cycle. Hence, the embodiment of FIG. 3 leads to fewer updates of the initialization vector than the embodiment of FIG. 4.

As discussed above, the step S35 of determining the secured data frame and the step S36 of transmitting the secured data frame are executed by the communication unit 22 of the communicating device 20. Without the security mechanisms introduced in the present disclosure, the communication unit 22 would process a protocol data unit, PDU, including mainly the data to be transmitted, generated by the application layer. With the present disclosure, the PDU to be processed includes the secured content and possibly the data to be transmitted if the secured content does not include encrypted data. Hence, the interface with the communication unit 22 is not really modified to introduce the proposed security mechanisms, it needs only to process a PDU of slightly greater size. Hence, in communicating devices 20 in which the communication unit 22 is hardware accelerated (FPGA, ASIC), the solution does not require hardware changes to the communication unit 22.

Figure 5:
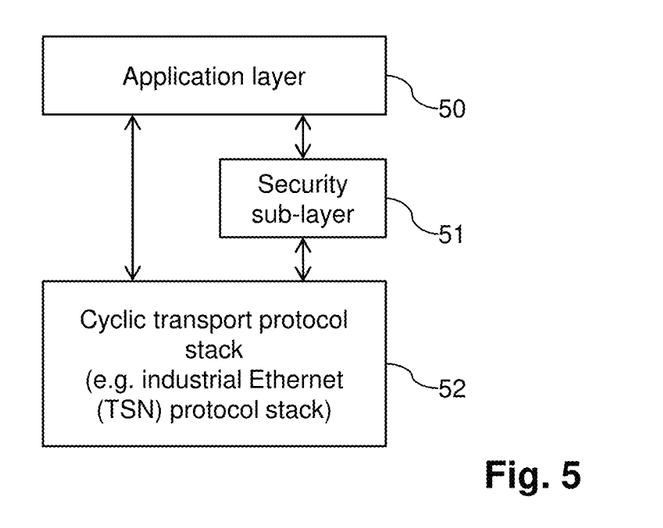
FIG. 5 is a schematic representation of the different protocol layers implemented, including a security sub-layer.

This is due to the fact that the security mechanisms are introduced in a higher protocol layer, such that the lower protocol layers are not impacted by the introduction of the security mechanisms, which is particularly convenient when said lower protocol layers are hardware accelerated (FPGA, ASIC). Indeed, as illustrated by FIG. 5, the security mechanisms (and in particular the handling of the secured content) are for instance implemented by a security sub-layer 51 located between the application layer 50 which generates the data to be transmitted (and which may receive data from other communicating devices 20) and a cyclic transport protocol stack 52, which may be e.g. an industrial Ethernet (TSN) protocol stack. The cyclic transport protocol stack 52 generates the secured data frame to be transmitted by using a PDU which includes the secured content, and extracts from a secured data frame received on the communication channel the secured content which is forwarded to the security sub-layer 51. It should be noted that the security sub-layer 51 may be bypassed in some cases. Indeed, there may be some cases in which the security mechanisms are not used. For instance, in FIG. 1, it is possible to use secured data frames only in the time slices #1, in which case no secured content is included in the data frames transmitted in the time slices #2.

Since the initialization vector (or, if used, the symmetric key) is not necessarily updated at each temporal cycle, the cryptographic algorithms used to compute the secured content need not to be executed at each temporal cycle, but only when said cryptographic algorithms might yield a secured content different from the secured content included in the secured data frame transmitted during the previous temporal cycle. Hence, the secured content needs to be computed by executing the cryptographic algorithms only when the initialization vector has been updated (i.e. data to be transmitted has changed or lifetime has expired) and when the symmetric key, if used, has been updated. In the other cases (no update of the initialization vector and no update of the symmetric key, if used), determining the secured content in step S34 may consist in retrieving the previous secured content transmitted in the secured data frame of the previous temporal cycle. With very short cycle periods, e.g. 30 µs, the secured content might not need to be actually computed in most cases and the previous secured content may be repeated. Hence the computational complexity required to determine the secured content may be limited, and compatible with a software implementation. With greater cycle periods, even if the secured content might need to be actually computed for more temporal cycles than with short cycle periods, there is more time available for this computation, which is therefore also compatible with a software implementation. Hence, the step S34 of determining the secured content can be implemented completely in software, in which case it can be introduced even in existing industrial networks, without hardware changes, by a simple software update of the communicating devices 20.

Figure 6:
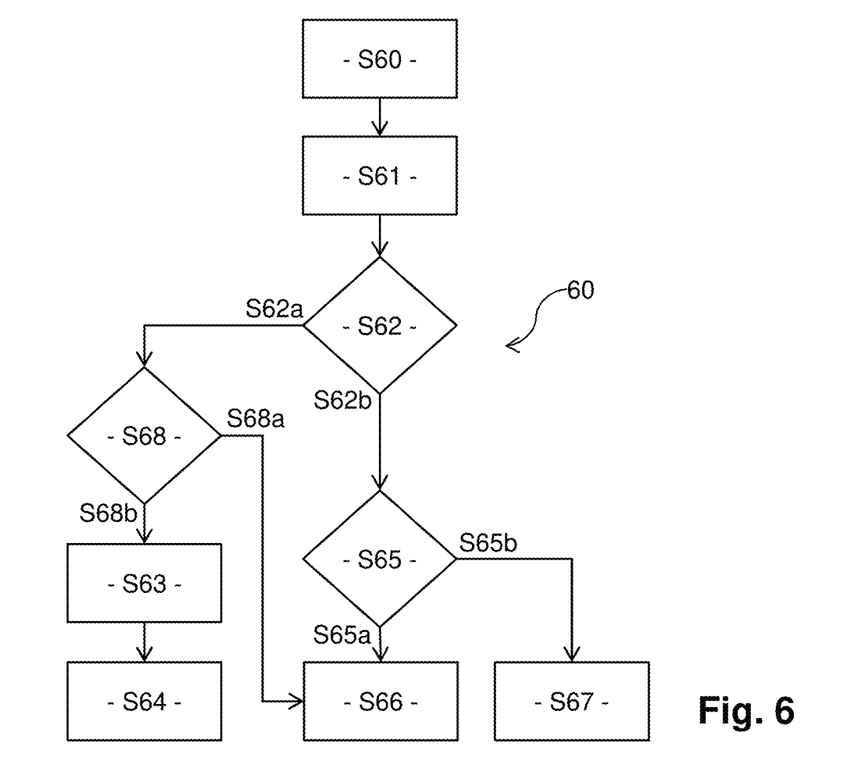
FIG. 6 is a diagram representing the main steps of an exemplary embodiment of a receiving method.

FIG. 6 represents schematically the main steps of an exemplary embodiment of a method 60 for receiving data by a receiving communicating device 20, said data being transmitted by a transmitting communicating device 20 by using a transmitting method 30 according to any one of the embodiments of the present disclosure. Hence, the receiving communicating device 20 receives secured data frames on the communication channel, which secured data frames include secured content as discussed previously. The receiving communicating device 20 processes the secured content to authenticate the transmitting communicating device 20 (if the secured content includes a signature) and/or to decrypt data (if the secured content includes encrypted data). However, since the secured content may remain unchanged from one temporal cycle to the following, the processing is not necessarily performed every temporal cycle when the result of the processing of the secured content received in a previous temporal cycle can be reused, thereby reducing the computational complexity at the receiving side also.

As illustrated by FIG. 6, the receiving method 60 comprises a step S60 of receiving, on the communication channel, a secured data frame in the current temporal cycle and a step S61 of extracting the secured content from the secured data frame of the current temporal cycle, which are executed by the communication unit 22 of the receiving communicating device 20.

As illustrated by FIG. 6, the receiving method 60 then comprises a step S62 of evaluating whether the secured content extracted from the secured data frame of the current temporal cycle is identical to the secured content extracted from the secured data frame received in the previous temporal cycle.

If the secured content is different from the secured content of the previous temporal cycle (reference S62a in FIG. 6), then the receiving method 60 comprises a step S63 of processing the secured content extracted from the secured data frame received in the current temporal cycle to authenticate the transmitting communicating device 20 and/or to decrypt data (by the security sub-layer 51). If the initialization vector is not included in the secured data frame, the receiving communicating device 20 updates its initialization vector, in order to maintain its initialization vector synchronized with the initialization vector of the transmitting communicating device 20 and processes the secured content by using its updated initialization vector. If a symmetric key is used, then an update of the symmetric key might also explain the different secured content. Hence, the receiving communicating device 20 can process the secured content by using the updated symmetric key and its previous (non-updated) initialization vector, and by using the updated symmetric key and an updated initialization vector. If the initialization vector used by the transmitting communicating device 20 is (at least partially) included in the secured data frame, it can be extracted and used to process the secured content. Before processing the secured content, the receiving communicating device 20 may perform further verifications on the initialization vector extracted from the secured data frame. For instance, when the initialization vector used is at least partially included in the received secured data frame, the receiving method 60 may comprise in some cases an optional step S68 of evaluating whether the initialization vector used has expired. If the lifetime of the extracted initialization vector has expired (reference S68a in FIG. 6), then a potential security issue is detected, and the receiving method 60 may optionally comprise a step S66 of reporting the potential security issue to the application layer 50 and/or to an administrator of the (industrial) LAN. If the lifetime of the initialization vector has not expired (reference S68b in FIG. 6), then the step S63 of processing the extracted secured content is executed.

If the processing of the secured content is successful (i.e. transmitting communicating device 20 successfully authenticated and/or data successfully decrypted), then the receiving method 60 comprises a step S64 of forwarding the data extracted from the secured data frame to the application layer 50 of the application unit 21.

If the secured content is identical to the secured content of the previous temporal cycle (reference S62b in FIG. 6), then the result of the processing of the secured content of the secured data frame of the previous temporal cycle can be reused without processing the secured content of the secured data frame of the current temporal cycle. For instance, the data received during the previous temporal cycle can be forwarded to the application layer 50 as the data received in the current temporal cycle.

However, in some cases, further verifications can be performed and the receiving method 60 of FIG. 6 comprises for instance an optional step S65 of evaluating whether the initialization vector used by the transmitting communicating device 20 has expired. Indeed, the receiving communicating device 20 can determine that the initialization vector should have been updated due to an expiration of its lifetime. Hence, if the initialization vector has expired, then this implies that the transmitting communicating device 20 should have used an updated initialization vector and that the secured content should not be identical to the secured content of the previous temporal cycle, which suggests a potential security issue such as a replay attack. If a symmetric key is used, a similar evaluation may be performed. Indeed, if an updated symmetric key should have been used by the transmitting communicating device 20, then the secured content should not be identical to the secured content of the previous temporal cycle, which similarly suggests a potential security issue such as a replay attack.

If the lifetime of the initialization vector has expired (reference S65a in FIG. 6), then a potential security issue is detected, and the receiving method 60 may optionally comprise the step S66 of reporting the potential security issue to the application layer 50 and/or to the administrator.

If the lifetime of the initialization vector has not expired (reference S65b in FIG. 6), then the result of the last processing of the same secured content (received in a previous temporal cycle) may be reused, and the secured content received in the current temporal cycle needs not to be processed. The receiving method comprises a step S67 of reusing the result of the processing of the previous secured content of the previous temporal cycle, which includes for instance forwarding the data received during the previous temporal cycle to the application layer 50 as the data received in the current temporal cycle. Since the secured content needs not to be processed every temporal cycle, the computation complexity of the processing of the secured content (and of the security sub-layer 51 in general) is limited and is compatible with a software implementation. Hence, the step S63 of processing the secured content can be implemented completely in software, in which case it can be introduced even in existing industrial networks, without hardware changes, by a simple software update of the communicating devices 20.

We now describe non-limitative examples of secured content computation, in the non-limitative case where an IE-TSN protocol stack is used to transport the data generated by the application layer 50 of the application unit 21.

The PDU to be transmitted by the IE-TSN protocol stack includes a collection of 16-bit value registers (referred to as Reg16 registers) and Boolean value I/O state (referred to as IO bits), all managed by the application layer 50. For instance, the application layer may manage n IO bits, referred to as IO[1 . . . n], and m Reg16 (16-bits) registers, referred to as Reg16 [1 . . . m].

For instance, if the secured content corresponds to a signature, then additional Reg16 registers may be introduced, referred to as $Reg16_{sig}$ registers, in which the signature may be copied after it has been determined (if the signature is unchanged from the previous temporal cycle, then the signature needs not to be recomputed and the content of the $Reg16_{sig}$ registers may remain unchanged from the previous temporal cycle). The signature computation may use any cryptographic algorithm known to the skilled person, for instance cryptographic hash functions such as SHA, MD5, etc., hash functions.

If the secured content corresponds to encrypted data, then the encrypted data may be copied in the IO bits and/or Reg16 registers (thereby erasing the non-encrypted data to be transmitted, previously copied in the IO bits and Reg16 registers by the application layer 50). However, some encryption algorithms, such as the advanced encryption standard, AES, process words of fixed size, for instance words of 256 bits for the AES-256 algorithm. Hence, if the number of bits (data to be transmitted) in the IO bits and Reg16 registers is lower than e.g. 256 bits, then the data to be transmitted may be first padded (e.g. with bits set to zero) in order to obtain a word of 256 bits, and additional Reg16 registers, referred to as $Reg16_{ene}$ registers, may be used in order to be able to store in the IO, Reg16 and $Reg16_{ene}$ registers 256 bits of encrypted (padded) data. Of course, it is also possible to encrypt only part of the data and to transmit the remaining data non-encrypted. For instance the data in the Reg16 registers may be encrypted while the data in the IO bits may be transmitted non-encrypted. The computation of the encrypted data may use any cryptographic algorithm known to the skilled person, for instance AES, Triple DES, RSA, etc.

Figure 7:
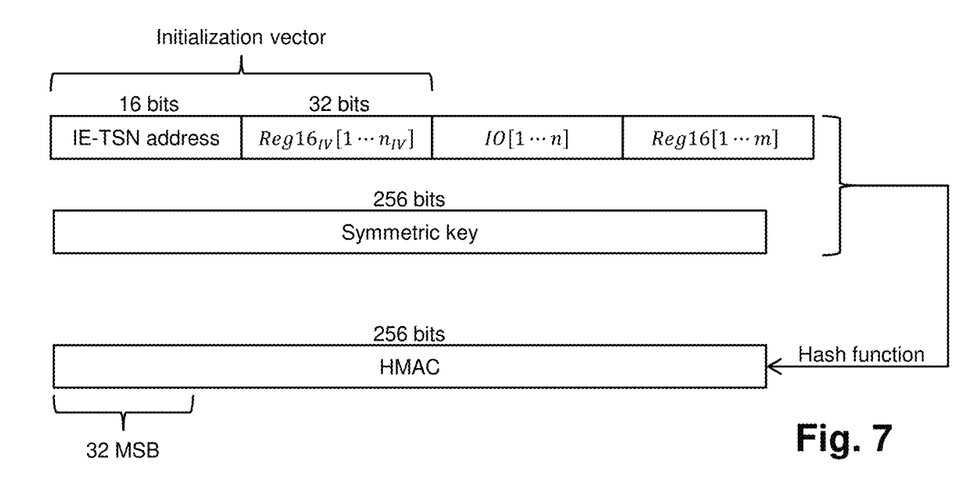
FIG. 7 is a schematic representation of an example of signature computation using a symmetric key.

FIG. 7 represents schematically a non-limitative example of signature computation using a symmetric key. In the example illustrated by FIG. 7, a dynamic part of the initialization vector is also transmitted with the data received from the application layer and the signature, and is included in additional Reg16 registers, referred to as $Reg16_{IV}$ registers. In the example illustrated by FIG. 7, $n_{IV}$ $Reg16_{IV}$ registers are used, referred to as $Reg16_{IV}[1 \ldots n_{IV}]$, with $n_{IV}=2$ such that the dynamic part of the initialization vector comprises 32 bits. The initialization vector comprises also a static part, which is not transmitted, which corresponds in this example to the 16-bits IE-TSN address of the transmitting communicating device 20 which is concatenated with the dynamic part of the initialization vector in $Reg16_{IV}[1 \ldots n_{IV}]$. In order to compute the signature, the initialization vector (static and dynamic parts) is concatenated with the data received from the application layer, in IO[1 . . . n] and Reg16[1 . . . m]. The resulting concatenated data is combined with a 256-bits symmetric key by using a cryptographic hash function, in order to obtain for instance a keyed-hash message authentication code, HMAC (as defined by RFC 2104). For instance the hash function used is a SHA function (as defined by RFC 6234). By doing so, a 256-bits HMAC is obtained. In order to reduce the size of the PDU forwarded to the IE-TSN protocol stack, the HMAC may optionally be truncated to produce the signature. For instance, only the 32 most significant bits (MSB) of the HMAC are kept, thereby producing a 32-bits signature which can be used to authenticate the transmitting communicating device 20, which can be copied in $n_{sig}=2$ $Reg16_{sig}$ registers, referred to as $Reg16_{sig}[1 \ldots n_{sig}]$.

Figure 8:
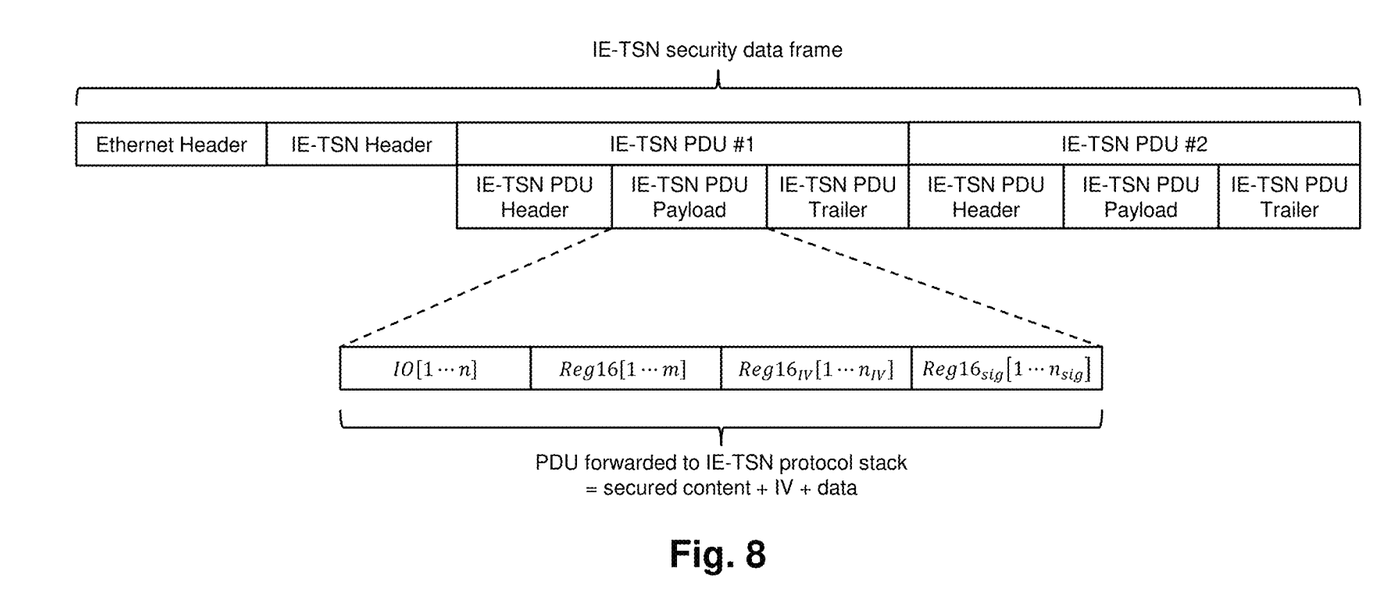
FIG. 8 is a schematic representation of an example of industrial Ethernet TSN secured data frame.

FIG. 8 represents schematically a non-limitative example of IE-TSN secured data frame including the signature (secured data) of FIG. 7. As discussed above, this example considers in a non-limitative manner that the dynamic part of the initialization vector is also included in the PDU forwarded to the IE-TSN protocol stack implemented by the communication unit 22. However, in other examples, the initialization vector may be completely included, included only in part, or not included at all, in the PDU forwarded to the IE-TSN protocol stack.

As can be seen in FIG. 8, the IE-TSN frame structure is left unchanged, and the only change is that the size of the PDU forwarded to the IE-TSN protocol stack has been increased with the addition of the registers $Reg16_{IV}[1 \ldots n_{IV}]$ and $Reg16_{sig}[1 \ldots n_{sig}]$. Hence, the IE-TSN protocol stack is unchanged since the security mechanisms are applied by an upper security sub-layer 51, above the IE-TSN protocol stack and below the application layer 50. If the cyclic data frame generation implemented by the communication unit 22 is hardware accelerated (FPGA, ASIC), the introduction of the security mechanisms does not require any changes to the existing hardware accelerated cyclic data frame generation.

Hence the present disclosure proposes a solution for introducing security mechanisms in cyclic transmissions in LANs, in particular industrial LANs, with a limited computational complexity. By introducing the security mechanisms at a high protocol layer (security sub-layer 51), for instance right below the application layer 50, the lower protocol layers are not impacted by the introduction of the security mechanisms. In particular, the security mechanisms can be introduced smoothly over any industrial Ethernet (TSN) protocol stack. Also, the computational complexity is limited by limiting the frequency at which a secured content needs to be computed (i.e. by actually executing the cryptographic algorithm(s)), such that the security sub-layer 51 can be implemented by software and deployed even in existing industrial networks, by a simple software update. The proposed security mechanisms increase the robustness against at least part of the potential attacks discussed above. For instance, encrypting the data increases robustness against eavesdropping. Including a signature increases robustness against data frame injection and data frame replay attacks, etc.

The invention claimed is:

1. A transmitting method for transmitting data by a communicating device on a communication channel shared by a plurality of communicating devices, the communication over the communication channel being organized according to temporal cycles repeated at a predetermined cycle period, wherein the communicating device is required to transmit data every temporal cycle and the data to be transmitted is repeated from one temporal cycle to the following if no new data to be transmitted is available, wherein said transmitting method comprises, for each temporal cycle:

determining, by the communicating device, a secured data frame based on the data to be transmitted,
    transmitting, by the communicating device, the secured data frame on the communication channel, wherein each secured data frame includes secured content determined by using a predetermined initialization vector, wherein the initialization vector has a lifetime associated thereto which corresponds to a maximum duration during which said initialization vector can remain unmodified, said lifetime being greater than or equal to a predetermined plurality of cycle periods, wherein the initialization vector is not modified when the data to be transmitted in the current temporal cycle is identical to the data transmitted in the previous temporal cycle provided the lifetime of said initialization vector has not expired.

2. The transmitting method according to claim 1, wherein the secured content of the secured data frame of the previous temporal cycle is repeated in the current temporal cycle, without recomputing said secured content, responsive to determining that recomputing a secured content for the current temporal cycle would yield the same secured content as in the previous temporal cycle.

3. The transmitting method according to claim 2, wherein the determination of the secured content of the secured data frame is implemented by software.

4. The transmitting method according to claim 1, wherein each temporal cycle comprises at least a first time slice and a second time slice, said first time slices for communicating data having higher timing constraints than data communicated during said second time slices, and wherein the secured data frames are transmitted during the first time slices.

5. The transmitting method according to claim 1, wherein the secured data frames are determined by providing the secured content to an industrial Ethernet protocol stack or an industrial Ethernet time-sensitive networking, TSN, protocol stack.

6. The transmitting method according to claim 1, wherein the lifetime of the initialization vector is greater than or equal to N times the cycle period, with N≥2.

7. The transmitting method according to claim 1, wherein the secured content of each secured data frame is further determined by using a predetermined symmetric key.

8. The transmitting method according to claim 1, wherein the secured content includes a signature and/or encrypted data.

9. The transmitting method according to claim 1, wherein the secured data frame includes all or part of the initialization vector.

10. A receiving method for receiving data frames by a communicating device, said data frames being transmitted by another communicating device by using a transmitting method according to claim 1, wherein the communicating device processes the secured content included in a secured data frame to authenticate the other communicating device and/or to decrypt the data included in the secured data frame, wherein said receiving method comprises:
  receiving a secured data frame in the current temporal cycle,
  extracting the secured content from the secured data frame of the current temporal cycle,
  responsive to detecting that the secured content extracted from the secured data frame of the current temporal cycle is identical to the secured content extracted from the secured data frame received in the previous temporal cycle and responsive to detecting that the initialization vector has not expired: reusing the result of the processing of the secured content of the secured data frame of the previous temporal cycle without processing the secured content of the secured data frame of the current temporal cycle.

11. The receiving method according to claim 10, wherein the processing of the secured content is implemented by software.

12. A computer program product comprising instructions which, when executed by at least one processor, configure said at least one processor to carry out the receiving method according to claim 10.

13. A computer-readable storage medium comprising instructions which, when executed by at least one processor, configure said at least one processor to carry out the receiving method according to claim 10.

14. A communicating device comprising at least one processor and at least one memory, configured to carry out the receiving method according to claim 10.

15. A local area network, LAN, comprising a plurality of communicating devices according to claim 14, wherein at least some of the communicating devices are connected together according to a daisy chain topology.

16. A computer program product comprising instructions which, when executed by at least one processor, configure said at least one processor to carry out the transmitting method according to claim 1.

17. A computer-readable storage medium comprising instructions which, when executed by at least one processor, configure said at least one processor to carry out the transmitting method according to claim 1.

18. A communicating device comprising at least one processor and at least one memory, configured to carry out the transmitting method according to claim 1.

19. A local area network, LAN, comprising a plurality of communicating devices according to claim 18, wherein at least some of the communicating devices are connected together according to a daisy chain topology.

* * * * *